3,266,597
ATOMIZER
Herbert Söchting and Gerhard Hitschmann, Vienna, Austria, assignors to Hoerbiger Ventilwerke Aktiengesellschaft, Vienna, Austria
Filed June 25, 1964, Ser. No. 377,936
Claims priority, application Austria, June 25, 1963,
A 5,077/63
10 Claims. (Cl. 184—56)

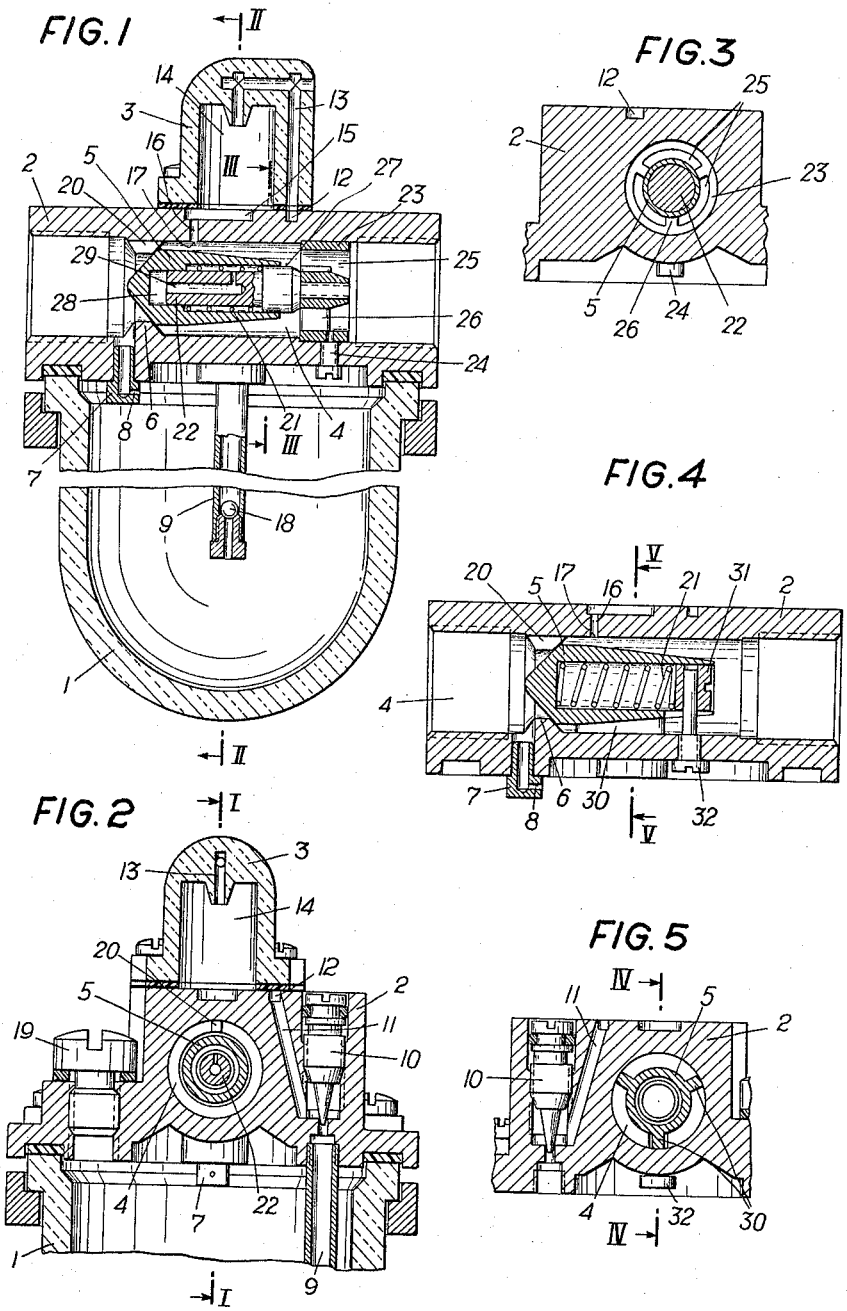

The invention relates to new and useful improvements in atomizers, particularly for lubricants, serving mainly to produce a fine oil spray in compressed-air lines for the lubrication of compressed-air installations, the lubricant being fed from a container via a suction pipe into a drip cowl of the atomizer head. For the purpose, a throttle is provided in the air duct, so as to produce a differential head between the pressure prevailing in front of and behind the throttle. Pressure in front of the throttle is directed via a bore or the like to the container from where the material to be atomized passes via a standpipe into the drip cowl and from there through a passage terminating behind the throttle into the air duct.

For the purpose of controlling the supply of lubricant to the air duct, conventional appliances of this type comprise a throttle controllable by means of an adjusting screw and inserted in the oil duct connected to the standpipe. Provided air consumption remains on the same level, the supply of oil can be varied in accordance with requirements by appropriately regulating the said throttle. If the rate of air consumption varies, however, the mixture ratio is also altered and the throttle has to be reset by hand. Another conventional appliance features a flap incorporated in the throttle element. However, this design is inconvenient insofar as any readjustment of the flap will adversely affect the rate of flow and impair the injector effect. Besides, a type of atomizer is known, wherein the throttled cross-section is variable by means of a displaceable piston. In this case too, it is necessary to appropriately adapt and/or regulate the appliance in accordance with a given throughput in order to obtain the correct mixture ratio.

In another conventional appliance of this type, an attempt has been made to obtain a constant mixture ratio by the incorporation of an automatic, spring loaded relief valve in the air duct, the body of said relief valve comprising a plate-shaped closing member provided with a shaft extending through a sleeve screwed into the air duct. However, on account of the different pressures prevailing in front of and behind the closing member, the valve body reciprocates between its extreme positions depending on the amount of air passing through the air duct and tends to flutter, so that this design too is unsuitable for delivering at all times the required amount of lubricant to the air stream. Furthermore, the sleeve provided for the guidance of the valve body is responsible for additional throttling and disturbance of the air flow. The same shortcomings are inherent in another conventional atomizer comprising a bell-shaped sleeve made of an elastic material installed in the air duct for the purpose of varying the cross-sectional area of the duct depending on the amount of air passing through it. For the purpose of establishing the pressure balance when the check valve is closed and/or the air duct is closed by the sleeve, a central bore extending through the valve body or an axial groove in the air duct is provided.

The invention is based upon an atomizer of conventional design comprising an automatic throttle valve located in the air duct traversing the atomizer head, the valve body guided in the air duct co-operating with a valve seat defined by an annular shoulder or the like and pressed against the latter by means of a valve spring.

It is the object of the invention to improve this conventional design by providing an atomizer wherein the required or pre-determined mixture ratio between the air and the material to be atomized always remains at a constant level irrespective of the amount of air passing through the air duct.

According to the invention, this is achieved by providing the valve body tapering off in the direction of the current in the air duct at least in the area of its extremity facing away from the current, its axial length extending from behind its point of contact with the valve seat being greater than the diameter of the valve seat. This particular design of the valve body ensures undisturbed flow in the air duct so as to enable the valve body to adjust itself automatically to the intermediate position corresponding to the amount of air passing through the air duct. As a result, the required differential head in the area in front of and behind the throttle will prevail at all times so as to deliver the required amount of oil corresponding to the amount of air passing through the air duct. Consequently, the atomizer according to the invention adjusts itself automatically to the amount of air passing through it, so as to ensure a permanently constant mixture ratio between the air and the material to be atomized into it even when the air consumption is subject to major fluctuations.

According to a preferred embodiment of the invention the valve body tapers off in the direction of the current in such a way as to produce an enlargement of the cross-sectional area of the air duct acting in the manner of a diffuser. This design causes pressure to rise in the rear of the valve body so as to ensure prompt adjustment of the valve body to the position corresponding exactly to any given amount of air, even if the valve spring should be comparatively weak. Moreover, the said diffuser effect makes for comparatively low pressure losses and atomization is extremely effective in any operational position. Finally, fluttering of the valve body is thereby also avoided.

In order to ensure convenient operation of the atomizer according to the invention, the rate of flow in the air duct should not be adversely affected by the necessary guidance of the valve body. Therefore, according to the invention the valve body is guided in the proximity of its two extremities and encompasses the valve spring designed as a helical spring and preferably located between the two guide points. This double means of guiding the comparatively long valve body ensures its accurate guidance over the entire range of its motion inside the air duct. In addition, friction is also reduced to a comparatively low level so that both when pressure rises and drops the valve body assumes its proper position in accordance with prevailing pressure conditions.

The valve body can be conveniently guided by a mandrel or the like located inside the valve body, said mandrel being held in position at one of its extremities by means of a bracket secured in the air duct and provided with apertures, and engaging with its other extremity in a cylindrical blind bore of the valve body. The extremity of the mandrel sliding in said blind bore acts as a damping piston for the attenuation of the motions of the valve body, thereby reducing the risk of fluttering in spite of the low friction produced by the guide means. In order to avoid excessive damping, such as is liable to occur for example if the guide means is oil-lubricated, according to the invention a vent duct connecting the blind bore with the interior of the valve body located between the two guide points can be provided in the mandrel and/or in the valve body. The cross-sectional area of this vent duct can be so dimensioned as to produce the required degree of damping.

According to still another feature of the invention, an axial passage, such as a groove or bore in axial alignment with the aperture through which the material to be atomized enters the air duct, by-passing the throttle valve when the valve seat is closed, can be provided in the valve seat and/or in the valve body. As a result, with the throttle valve closed or only slightly open, the comparatively small amount of air is concentrated during its passage through the air duct and directed at high speed alongside the aperture through which the material to be atomized enters the air duct, thereby ensuring effective atomization and obtaining the required mixture ratio even with small amounts of air.

Further objects and details of the invention will appear from the following description of several embodiments of the invention with reference to the accompanying drawings in which:

FIG. 1 is a longitudinal sectional view of the atomizer,

FIG. 2 is a longitudinal sectional view taken along line II—II of FIG. 1, and

FIG. 3 is a cross-sectional view of a detail on line III—III of FIG. 1.

FIGS. 4 and 5 illustrate a slightly modified embodiment of the invention, FIG. 4 showing a longitudinal section analogous to FIG. 1 along line IV—IV of FIG. 5 and FIG. 5 a cross-sectional view along line V—V of FIG. 4.

The embodiments illustrated show an atomizer for lubricants for the lubrication of compressed-air lines or installations. Reference number 1 designates the container for the lubricant to be atomized, number 2 the atomizer head and number 3 the drip cowl preferably made of a transparent material. A through duct 4 for the air to be supplied to the compressed-air installations to be lubricated is provided in the atomizer head 2, an automatic throttle valve being arranged inside said port, comprising a valve body 5, whose valve seat 6 is formed by an annular shoulder reducing the cross-section of the air duct 4. The two extremities of the air duct 4 are threaded for the attachment of the compressed-air pipes.

As shown in FIG. 1 air flows from left to right through the air duct 4 traversing the atomizer head 2. In front of the throttle valve as viewed in the direction of the air flow the duct 4 communicates via a bore 8 provided in a bolt 7 with the interior of the container 1, so that the pressure prevailing in this zone of the air duct 4 impinges upon the oil level in the container 1. Emerging from the container 1 in an upward direction is a standpipe 9 which as shown in FIG. 2 communicates via a throttle adjustable by means of a screw 10 with the duct 11 terminating in a groove 12 provided in the top of the atomizer head 2. A duct 13 provided in the drip cowl 3 extends from the groove 12 also shown in FIG. 1 and terminates in a vertical direction in the cavity 14 of the drip cowl 3. A recess 15 provided at the bottom of the cavity 14 communicates with the air duct 4 via a passage 16 the aperture 17 of which is located behind the throttle cross-section defined by the throttle valve as viewed in the direction of the air flow. As appears also from FIG. 1, the standpipe 9 includes a spring-loaded check valve 18. Reference number 19 designates the filling screw for the lubricant.

In all of the embodiments illustrated the valve body 5 is tapering off in the direction of the air current through the duct 4, in the area of its extremity facing away from the current and has a length approximately double the diameter of the valve seat 6. The peripheral surface of the valve body 5 presenting rotation symmetry has a smooth finish and the taper is preferably such as to produce an enlargement of the cross-sectional area of the air duct acting like a diffuser. In the valve seat 6 an axial groove 20 is provided which by-passes the throttle valve when the valve body 5 is in its closed position. Furthermore, the valve body 5 is guided at two points in spaced relation to each other, between which the valve spring 21 designed as a helical spring is located and encompassed by the valve body 5.

According to the embodiment of the invention illustrated in FIGS. 1 to 3, a mandrel 22 coaxially arranged inside the air duct 4 is provided for the guidance of the valve body 5, one extremity of the said mandrel being screwed into a bracket 23 secured in the duct 4 by means of the screw 24. In the present instance, the bracket 23 is of a cylindrical design and presents apertures 25 separated from each other by ribs 26 as illustrated in FIG. 3. Likewise, the bracket might also be start-shaped without any outer shell. In the proximity of the bracket 23 the mandrel 22 is provided with a collar 27 on which the one extremity of the vave body 5 is sliding. The other, free extremity of the mandrel 22 engages in a cylindrical blind bore 28 of the valve body 5, communicating via a vent duct 29 with the interior of the valve body 5 located between the two guide points. This ensures convenient damping of the motions of the valve body 5 and precludes fluttering.

The embodiment of the invention illustrated in FIGS. 4 and 5 differs from those shown in FIGS. 1 to 3 only insofar as the valve body 5 is guided on the wall of the air duct 4 at its front end as viewed in the direction of the air current. For that purpose it carries three ribs 30 arranged in staggered relation around its periphery as shown in FIG. 5, the said ribs adjoining the wall of the air duct 4. The rear end of the valve body 5, however, slides on a cylindrical guide member 31 held in concentrical relation to the air duct 4 by means of a screw 32 only. In order to facilitate its axial motions the valve body 5 presents an appropriate notch in the area of the screw 32.

When air passes through the air duct 4, a differential head is produced by the throttle valve between the areas in front of same and behind, as a result of which the lubricant is delivered dropwise via the standpipe 9 and the adjoining ducts 11, 12 and 13 into the cavity 14 of the drip cowl 3. The drops can be counted through the transparent walls of the cowl 3. The lubricant then passes from the cavity 14 through the recess 15 and the passage 16 at the aperture 17 into the air stream traversing the air duct 4. The quantity of oil delivered for any given differential head can be controlled by appropriately adjusting the screw 10 (FIG. 2) as required. The lubricant contained in the ducts is prevented from flowing back into the container 1, for example when the compressed-air installation is switched off, by the check valve 18 provided in the standpipe 9. In addition, the bore 8 provided in the screw 7, through which the air duct 4 communicates with the interior of the container 1, acts as a throttling cross-section so that any sudden change of pressure in front of the throttle valve is delayed in its action on the level of the lubricant in the container 1. These measures ensure a high degree of continuity of the lubricant supply.

The design of the throttle valve according to the invention ensures a constant mixture ratio independently of the rate of air flow passing through the air duct 4 and moreover, positive atomization of the lubricant. The mixture ratio as pre-set by means of the screw 10 is maintained under all conditions of operation, as the valve body 5 will adjust itself automatically to the position corresponding to any given flow conditions. In the annular gap around the valve body 5 a diffuser-like effect is produced which ensures positive atomization and affords additionally convenient recovery of pressure. The pressure thus recovered produces a reaction on the valve body 5, by means of which the same is permanently held in the position corresponding to any given pressure condition and producing the required mixture ratio. Finally, the groove 20 by-passing the throttle valve in alignment with the aperture 17 through which the material to be atomized enters the air duct 4, ensures adequate air speed for positive atomization in the area of the aperture 17 even if the amount of air available is comparatively small. Consequently, the atomizer according to the invention can be used for appliances of various sizes and also for a plurality of appliances to be switched on and off alternatingly, without the need for subsequent readjustment.

We claim:

1. An atomizer, particularly for lubricants, comprising an atomizer head provided with a container for the material to be atomized, an air duct for the passage of air traversing said atomizer head and a throttle valve in the said air duct, said throttle valve comprising a valve body slidably guided in the air duct and co-operating with a valve seat provided in the air duct and pressed against the valve seat by means of a valve spring, the said valve body tapering off in the direction of the current in the air duct at least in the area of its extremity facing away from the current, its axial length located behind the point of contact with the valve seat being larger than the diameter of the valve seat.

2. An atomizer according to claim 1, wherein the valve body is tapering off in the direction of the current in such a way as to produce an enlargement of the cross-sectional area of the air duct acting in the manner of a diffuser.

3. An atomizer according to claim 1, wherein the valve body is concentrically guided in the said air duct in the proximity of its two extremities and encompasses the valve spring designed as a helical spring.

4. An atomizer according to claim 3, wherein the valve spring designed as a helical spring is provided between the two guide points of the valve body.

5. An atomizer according to claim 1, wherein a mandrel is provided for the guidance of the valve body, said mandrel being located inside the valve body and held in position at one of its extremities by means of a bracket secured in the air duct and provided with apertures, and engaging with its other extremity in a cylindrical blind bore of the valve body.

6. An atomizer according to claim 5, wherein the blind bore provided in the valve body communicates with the interior of the valve body located between the two guide points of the valve body via a vent duct.

7. An atomizer according to claim 6, wherein the vent duct is provided in the mandrel serving as a guide for the valve body.

8. An atomizer according to claim 1, wherein an axial passage is provided, by-passing the throttle valve when the valve seat is closed by means of the valve body.

9. An atomizer according to claim 8, wherein the material to be atomized is delivered to the air duct via a passage terminating in said air duct in a radial direction, the axial passage by-passing the throttle valve when the valve seat is closed by the valve body being in axial alignment with the aperture of said passage through which the material to be atomized enters the said air duct.

10. An atomizer according to claim 8, wherein the axial passage by-passing the throttle valve when the valve seat is closed by the valve body is defined by an axial groove provided in the valve seat.

References Cited by the Examiner

UNITED STATES PATENTS

Re. 24,291    3/1957    Goodyer _____ 184—55

FOREIGN PATENTS 815,550    6/1959    Great Britain.

LAVERNE D. GEIGER, *Primary Examiner.*

H. BELL, *Assistant Examiner.*